United States Patent [19]

Borenstein et al.

[11] E Patent Number: Re. 31,783

[45] Reissued Date of Patent: Jan. 1, 1985

[54] METHOD AND APPARATUS FOR CONTROLLING YARN PLUG LENGTH

[75] Inventors: David E. Borenstein; Richard C. Newton, both of Greenville, S.C.

[73] Assignee: Phillips Petroleum Company, Bartlesville, Okla.

[21] Appl. No.: 837,233

[22] Filed: Sep. 27, 1977

Related U.S. Patent Documents

Reissue of:

[64] Patent No.: 3,977,058
Issued: Aug. 31, 1976
Appl. No.: 559,158
Filed: Mar. 17, 1975

U.S. Applications:

[62] Division of Ser. No. 363,480, May 24, 1973, Pat. No. 3,886,636.

[51] Int. Cl.[3] ..... D02G 1/20

[52] U.S. Cl. ..... 28/221; 28/245; 28/249; 28/250; 28/255; 28/258; 28/266; 28/271

[58] Field of Search ..... 28/248, 249, 250, 251, 28/255, 258, 265, 266, 268, 271, 221, 240, 241, 245

[56] References Cited

U.S. PATENT DOCUMENTS

| | | | |
|---|---|---|---|
| 3,174,206 | 3/1965 | Mattingly et al. | 28/1.7 |
| 3,778,872 | 12/1973 | Newton | 28/72.14 X |
| 3,863,311 | 2/1975 | Cartlidge et al. | 28/1.7 |
| 3,961,401 | 6/1976 | Ferrier et al. | 28/249 |
| 3,961,402 | 6/1976 | Ferrier et al. | 28/249 |

*Primary Examiner*—Louis Rimrodt

[57] ABSTRACT

A continuous synthetic filament yarn is processed by crimping, entangling, and straightening the yarn. The yarn is straightened by heating under tension, resulting in a yarn that can be used in its straightened form and later bulked by a subsequent process such as dyeing, boiling, heating, etc. The length of a yarn plug formed by crimping is controlled by controlling the temperature of the yarn.

7 Claims, 2 Drawing Figures

METHOD AND APPARATUS FOR CONTROLLING YARN PLUG LENGTH

Matter enclosed in heavy brackets [ ] appears in the original patent but forms no part of this reissue specification; matter printed in italics indicates the additions made by reissue.

This application is a division of copending application Ser. No. 363,480, filed May 24, 1973, now U.S. Pat. No. 3,886,636, granted June 3, 1975.

BACKGROUND OF THE INVENTION

The invention relates to a method and apparatus for processing synthetic filament yarn.

It is frequently desirable to produce a yarn having increased bulk and cover, improved hand, and which can be handled conveniently by textile making processes such as weaving, tufting, knitting, etc. It is also desirable to wind packages of yarn as dense as reasonably possible so as to limit the number of package changes during the winding process and during further handling of the yarn. It is also frequently desirable to use yarn that has been textured and then straightened for easier handling but where the texture will return upon subsequently applying heat to the yarn.

In crimping yarns by methods which result in the formation of a plug of crimped yarn, it is necessary to control the length of the plug. This has been accomplished in a number of ways such as by weighted or pressure controlled gates, controlled draw-off speed, etc.

It is an object of the invention to produce a straightened, textured yarn. Another object of the invention is to produce packages of yarn as dense as possible. Still another object of this invention is to produce straightened textured yarn which can be handled conveniently during textile manufacturing operations and will assume its textured form by reheating the product. And yet another object of the invention is to control the plug length of a crimped yarn.

SUMMARY OF THE INVENTION

We have discovered a method for producing textured synthetic filament yarn by the process of crimping and entangling drawn synthetic filament yarn, followed by straightening the yarn by heating and tensioning the textured yarn. Further according to our invention there is provided apparatus comprising a crimping means, an entangling means and a straightening means arranged in that order. Further according to our invention the length of the yarn plug formed during crimping of the yarn is controlled by adjusting the temperature of the yarn prior to or during the crimping step. Further according to our invention there is provided method and apparatus for controlling the length of a yarn plug formed by crimping means by monitoring the position of a yarn plug and controlling the temperature of the yarn in response thereto.

DETAILED DESCRIPTION OF THE INVENTION

Figure 1:
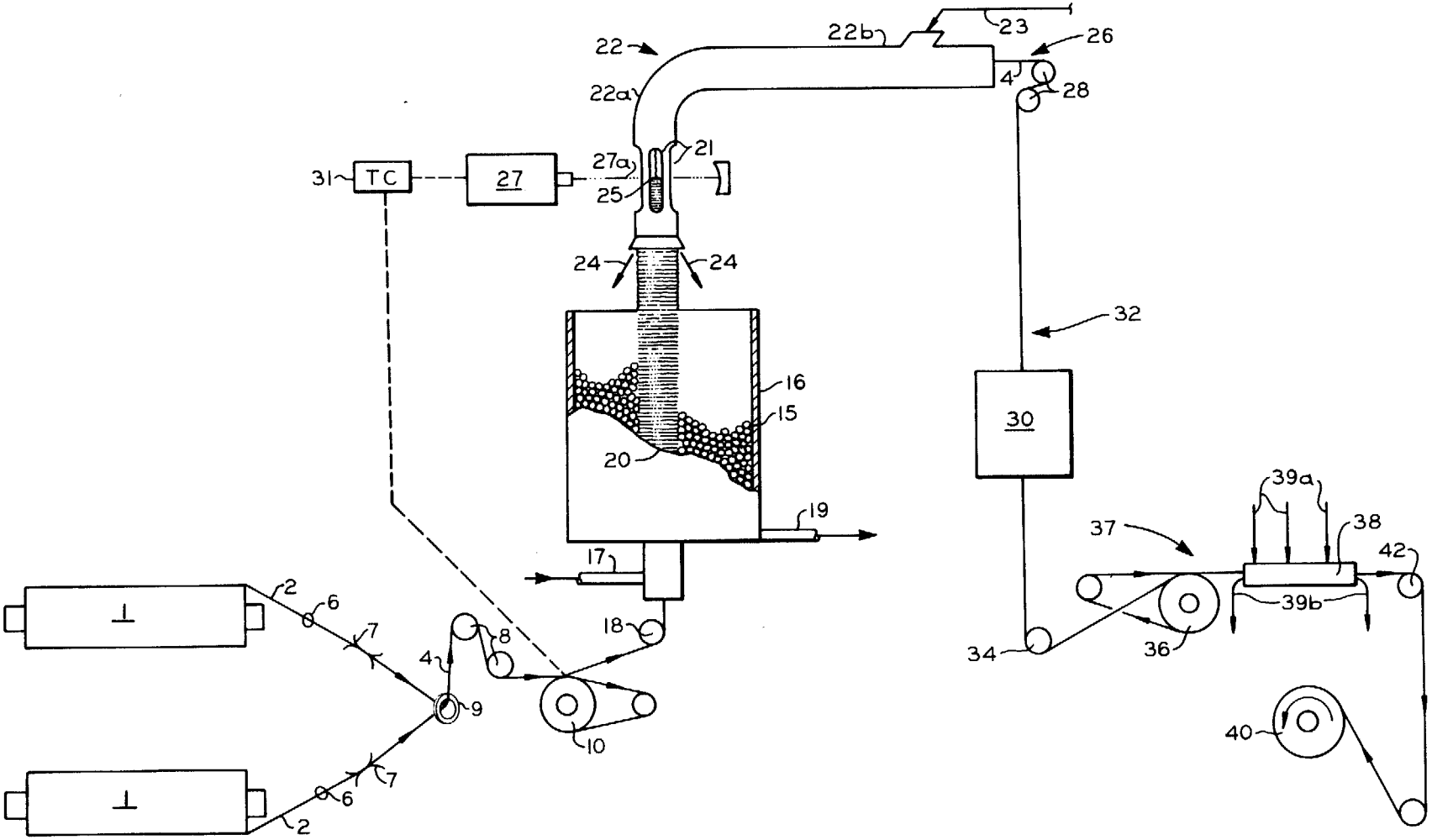
FIG. 1 is a schematic flow sheet representing an embodiment of the present invention in which previously drawn yarn is processed.

In FIG. 1 continuous filament drawn synthetic yarn 2 is fed from a plurality of packages 1 through eyelet guides 6 and tensioned by tensioning gates 7 to control the yarn coming from the packages. The yarn is brought together in guide 9 to form yarn 4 of the desired total denier and tensioned by a tensioning gate 8 to provide better control of the yarn. The yarn 4 is fed to a heated feed roll 10. The yarn is then fed to suitable crimping means 16. In the embodiment illustrated in FIG. 1, crimping means 16 includes a fluid jet portion and a chamber containing a plurality of stacked members such as balls 15. A heated fluid enters the jet portion through inlet 17 to heat the yarn and assist in crimping and exits the means at 19 and through the stacked members 15. An adjustable angle idler 18 is used to insert a controllable amount of false twist into the yarn prior to crimping. This is useful in controlling the heat losses from the yarn and, hence, the yarn temperature entering the crimping means 16. The yarn plug 20 formed in crimping means 16 is passed through a tube 22 in which the yarn plug 20 is broken up and cooled by countercurrent air 23 or other suitable fluid.

The length of the yarn plug 25 in the crimping means 16 is inversely proportional to the temperature of the yarn in the crimping means. Increasing the temperature of the yarn in the crimper causes the yarn to shrink increasing the denier of the yarn and thus decreasing the yarn plug length. Therefore decreasing the temperature of the yarn increases the yarn plug length. Temperature controller 31 controls the temperature of feed roll 10 which in turn controls the temperature of the yarn entering the crimping means and consequently the length of the yarn plug. Temperature controller 31 is set to maintain the temperature of the roll being controlled at a preset temperature or set point. This temperature controller is of a standard type which senses the resistance of a temperature-sensitive device, such as a thermistor. In addition, a bypass circuit is contained in the temperature controller which increases the temperature of the roll being controlled above the set point whenever said bypass is activated. Since a thermistor decreases in resistance with increasing temperature, the bypass circuit merely increases the actual resistance as seen by the temperature controller causing the temperature controller to heat the roll above the set point. Heat is added to the roll until the resistance of the thermistor as modified by the bypass circuit equals the resistance of the thermistor at the set point. Electric eye 27 senses the length of the yarn plug 25 and activates the bypass circuit of the temperature controller 31 if the yarn plug breaks the electric eye beam 27a. This causes the temperature controller 31 to raise the temperature of the roll being controlled above the set point, increasing the temperature of the yarn and decreasing the yarn plug length. When the yarn plug 25 falls below the electric eye beam 27a, the bypass circuit is deactivated and temperature controller 31 maintains the temperature of the roll being controlled at the set point.

In setting the set point of temperature controller 31, the controller should have a set point at which the temperature of the roll being controlled is maintained so that the yarn plug length is maintained just above the electric eye beam 27a, that is, where the plug just breaks the beam. When the electric eye beam 27a is broken by the yarn plug 25 the bypass circuit is activated causing the temperature controller 31 to increase the temperature of the roll being controlled above the set point. This in turn increases the temperature of the yarn and thus lowers the yarn plug height 25 until the electric eye 27 is exposed to light beam 27a indicating the yarn plug is lower than the light beam. Therefore temperature controller 31 tries to maintain the end of the yarn plug just above the electric eye beam and the electric eye 27 tries to maintain the end of the yarn plug just below the electric eye beam. This competition approaches an equilibrium which results in excellent control of the yarn plug length and crimp level.

In practice the bypass circuit causes the temperature controller 31 to increase the temperature of the roll being controlled above the set point by an amount sufficient to insure that the yarn plug falls below the electric eye beam 27a. The control of this invention is applicable to synthetic filament yarns generally and finds particular utility in processing the thermoplastic yarns including those of polyamides, polyesters and polyolefins. In processing nylon, excellent results can be obtained when the bypass circuits increases the temperature of the roll being controlled approximately 8° C. above the set point. However, normally when the bypass circuit is activated the temperature of the roll being controlled has to reach only a few degrees above the set point before the yarn plug falls below the electric eye beam.

Temperature controller 31 is commonly known as a standstill temperature offset controller of the proportional type with an on-off bypass circuit. However, other controllers can be used, such as those that sense voltage rather than resistance. Also the controller can be of the on-off or proportional type for either the set point or bypass mode of operation.

Further in accordance with FIG. 1 the crimped yarn 4 is tensioned by tension pins 28 and passed through an entangler 30. The crimped and entangled yarn 4 is passed over guide 34 and on to a withdrawal roll 36. The crimped and entangled yarn 4 is exposed to relatively high tension by a constant tension winder 40 after passing over guide 42. While the yarn is exposed to the relatively high tension, the yarn is heated by a suitable heater 38 with the heating fluid entering and exiting the chamber at 39a and 39b respectively.

The tension of the yarn in the entangling zone 32 must be relatively low as compared with the tension of the yarn in the heat treatment zone 37. This is because high tension in the entangling zone 32, would defeat the entangling process. Also a low tension in the straightening zone 37, would impede the straightening process, thus the entangling and straightening zones must be isolated by some means, as for example the withdrawal roll 36.

Figure 2:
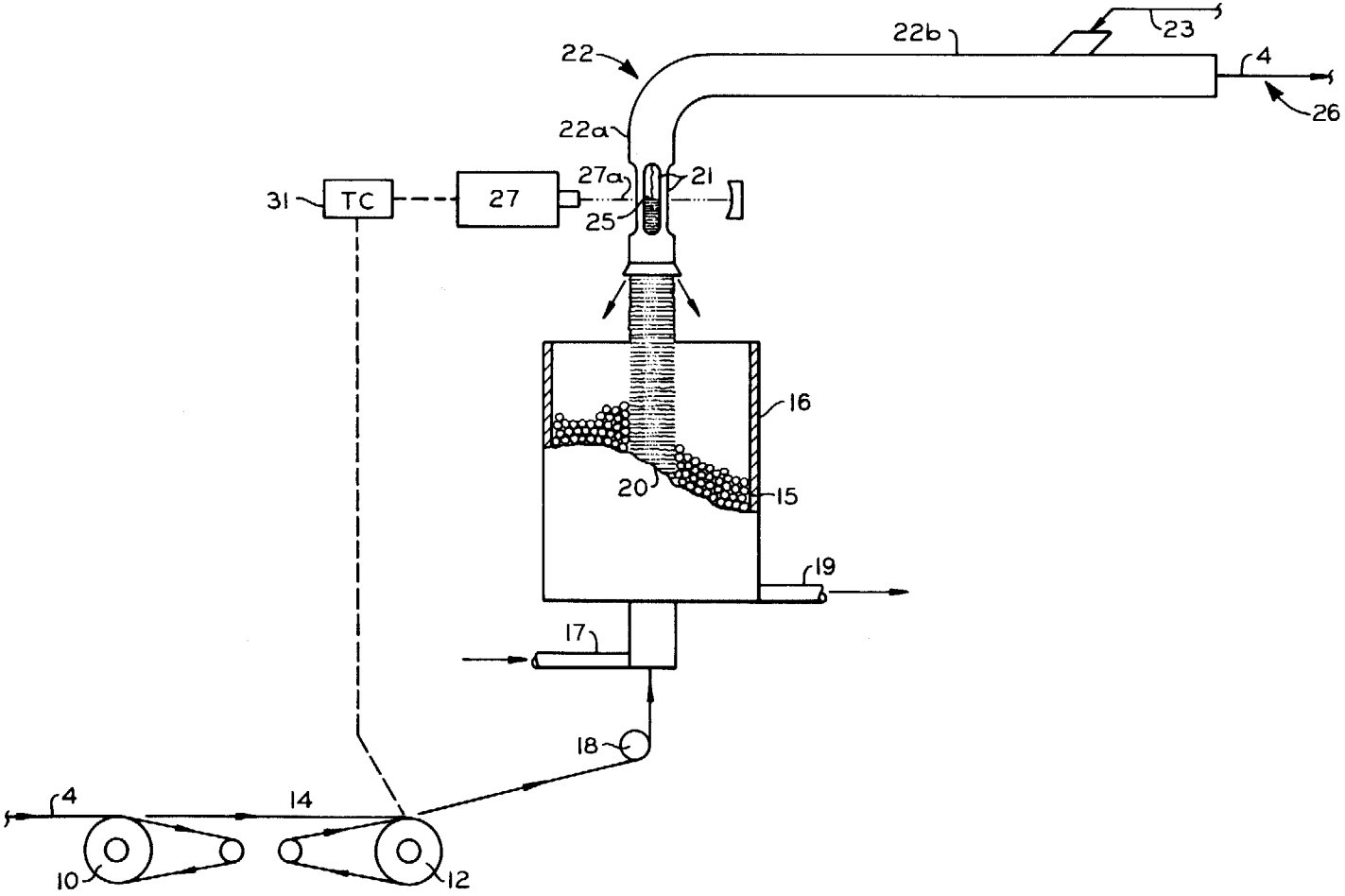
FIG. 2 is a schematic flow sheet representing an embodiment of the present invention and primarily differs from FIG. 1 in that undrawn yarn or partially drawn yarn is processed.

FIG. 2 illustrates the process of FIG. 1 in which undrawn yarn or partially drawn yarn is used; the primary difference being that the heated draw roll 12 *operating at higher peripheral speed than the feed roll 10* is added to the process *downstream of the feed roll 10 to draw the yarn*. Temperature controller 31 and the bypass circuit activated by the electric eye 27 control the temperature of the draw roll 12 rather than the feed roll 10 as in FIG. 1. However, it is possible to control the temperature of the feed roll 10 rather than the draw roll 12 even though a drawing step is used in the process. The draw ratio should be the highest ratio consistent with good drawing performance. Except for these distinctions the process of FIG. 2 is identical to that of FIG. 1.

When the yarn plug length is controlled by controlling the speed of the withdrawal roll, a problem can arise due to variation of the denier of the yarn. In accordance with the present invention, where the temperature of the yarn entering the crimping zone is adjusted to control the yarn plug length 25 the withdrawal roll 36 can be maintained at a constant speed. Controlling the yarn plug length in this way gives the unexpected result of producing a yarn having a denier within a more narrow range than can be obtained by controlling the yarn plug length by varying the speed of the withdrawal roll. Upstream variables other than the temperature of the feed or draw rolls can be adjusted to control the yarn temperature such as for example the temperature or flow rate of the fluid used in the fluid jet.

It should also be noted that in practice, timers or time delay relays are incorporated into the electric eye circuit in order that the bypass circuit of temperature controller 31 is not activated or once activated is not deactivated until a pre-set time has lapsed. This provides a dampening effect to the control circuit and prevents a chattering or hunting condition from developing.

Yarn plug sensors other than an electric eye can be used, such as mechanical sensing devices or a combination of electrical and mechanical sensing devices as known in the art.

Also two temperature controllers could be utilized rather than one if desired. One temperature controller would function similar to temperature controller 31 except that the electric eye would not activate a bypass circuit. In this system the electric eye would switch from one temperature controller to the other with the second temperature controller having a set point higher than temperature controller 31.

In a specific example, tube 22 had an inside diameter of about 1 inch and was constructed of a material having smooth walls so that there was minimum resistance exerted on the yarn. A lining of polytetrafluoroethylene or other suitable material may be employed to advantages for this purpose. The tubing section 22a had a length of 12½ inches and tubing section 22b had a length of 47½ inches. Tube 22 was provided with a 90° bend on a 7½ inch radius, but the tube 22 may be straight. The four openings 21 were approximately ⅜ inches wide and 6 inches long located upstream of the bend but they can be located either upstream or downstream from the bend. Air entered the tube 22 at point 23 flowed countercurrent to the direction of movement of the yarn 26 through the tube 22 and exited the tube at openings 21 and 24. The air was at ambient temperature and the actual flow rates used are shown in the examples contained herein.

The tension of the yarn in the entangler should be set to facilitate good entangling. The tension of the yarn in zone 26 can be somewhat less than the tension of the yarn during entangling, zone 32.

Heat, moisture and tension are applied to the yarn prior to packaging in zone 37. These parameters can be varied to control the degree of straightening the yarn experiences. Moisture affects some yarns differently than others. For example nylon is generally influenced by moisture more than polyester or polypropylene. That is, in processing nylon, it has been found that moisture is a more important parameter in the yarn straightening step than for either polyester or polypropylene. A convenient method of heating and moisturizing the nylon yarn is to heat the yarn in a chamber with saturated steam. However, other means for both heating and moisturizing the yarn can be used.

The tension of the yarn in zone 37 should be sufficient to straighten the yarn but not high enough to draw the yarn. This tension is generally higher than the tension of the yarn during entangling. For processing nylon yarns, excellent results were obtained using a tension in the range of 0.04 to 0.12 grams/denier in the straightening zone.

The temperature of the yarn during the straightening step should be high enough to facilitate straightening. It should be kept in mind that all of these parameters i.e., heat, moisture and tension, effect the straightening of the yarn and each parameter should be adjusted in relation to the others.

In addition by practicing the present invention the yarn can be completely processed in one continuous operation without allowing the yarn to cool to ambient temperature once the processing has begun. Most yarns have a tendency to degrade to some extent each time they are reheated. If the yarn can be processed in one continuous operation as in the practice of the present invention where the yarn is not completely cooled down and then reheated again, the yarn processed will be subjected to fewer conditions which promote degradation and thus be a higher quality yarn.

The process of this invention results in a packaged yarn in which the package itself has a high density, the yarn is straight and easy to use for tufting or other textile processes and the bulk returned by applying heat to the yarn. It is important for the yarn to be wound while still warm and under desired tension. This increases the yarn's stability with regard to its straightened condition once tension is relaxed.

While the above process is applicable generally to synthetic filament yarns capable of being crimped, entangled, straightened, and subsequently bulked by heating, it is particularly useful in processing the thermoplastic yarns including those of polyester and polyolefin and more especially polyamides. Excellent results have been obtained using the above process on the synthetic filament yarn polycaprolactam (nylon 6) and poly(hexamethylene) adipamide (nylon 66) as shown by the following examples in which the process of the present invention as shown in FIG. 2 of the attached drawings was used with the exception that the electric eye was not used and the plug length was controlled manually by adjusting the speed of the withdrawal roll and/or the temperature of the draw roll.

EXAMPLE I

A feed yarn comprising two ends of 4700 denier 70 filament trilobal polycaprolactam (nylon 6) was used. The heating chamber 38 was a 3/16 inch diameter tube two feet long containing three 3/16 inch heating fluid inlets equally spaced along the length of the tube. Saturated steam at 24 psig was used as the heating media. The textured product was 3200 denier. The other process conditions are illustrated in Table I.

TABLE I

| Item | Process Conditions |
|---|---|
| Tensions, grams | |
| Creel, single end | 50 |
| Entering feed roll | 150 |
| Entering texturing jet | 125 |
| Leaving quench tube | 50 |
| Entangling zone | 70 |
| Post-treatment and winding | 200 |

TABLE I-continued

| Item | Process Conditions |
|---|---|
| Temperatures, °F. | |
| Feed roll (9 wraps) | 120 |
| Draw roll (7 wraps) | 338 |
| Jet steam | 540 |
| Jet Steam | |
| Flow, lb/hr | 21 |
| Pressure, psig | 84 |
| Air Flows, scfm | |
| Tube | 12 |
| Entangler | 19 |
| Draw Ratio | 3.75 |
| Speeds, m/min | |
| Draw roll | 1100 |
| Winder feed roll (9 wraps) | 800 |
| Doff cycle, minutes | 14 |
| Package weight, net lbs. | 9.5 |
| Package diameter, inches | 9¼ |

The process produced a straightened textured yarn wound in a relatively dense package. The yarn had very high stability with respect to its straightened form under zero tension and proved to be excellent carpet yarn having very good carpet pattern definition and tufting qualities.

EXAMPLE II

Using the process shown in FIG. 2 with the exception previously noted the feed yarn was composed of two ends of 3900 denier 70 filament trilobal polycaprolactam (nylon 6). The steam chamber described in Example I was used. Table II illustrates the process conditions. Tensions not listed are the same as those listed in Table I of Example I.

TABLE II

| Item | Process Conditions | | |
|---|---|---|---|
| | Sample 1 | Sample 2 | Sample 3 |
| Temperatures, °F. | | | |
| Feed roll (9 wraps) | 150 | 190 | 190 |
| Draw roll (9 wraps) | 395 | 360 | 360 |
| Jet steam | 520 | 520 | 520 |
| Jet Steam | | | |
| Flow, lb/hr | 18.8 | 18.8 | 18.8 |
| Pressure, psig | 90 | 90 | 90 |
| Air flows, scfm | | | |
| Tube | 5 | 5 | 5 |
| Entangler | 22 | 22 | 19 |
| Draw Ratio | 3.75 | 3.75 | 3.75 |
| Speeds, m/min | | | |
| Draw roll | 1125 | 1125 | 1125 |
| Winder feed roll (9 wraps) | 800 | 800 | 800 |
| Tensions, gm | | | |
| Entangling zone (when entangler is off) | 60 | 60 | 60 |
| Post-treatment and winding | 200 | 200 | 200 |

The textured product was 2600 denier. The primary process changes in Example II from that of Example I were (1) lower jet stream flow and temperature (2) higher draw roll temperature (changes were made to reduce crimp, especially crimp frequency) and (3) lower entangling zone tension due to reduced quench air flow to increase entanglement.

The qualities of the yarn produced were comparable to those of the yarn produced in Example I.

EXAMPLE III

Again referring to FIG. 2 with the exception previously noted the feed yarn was three ends of almost triangular cross section 2000 denier 30 filament non-delustered poly(hexamethylene adipamide (nylon 66) undrawn yarn. The fluid jet capillary length was 3.1 inches. The process conditions are depicted in Table III. The same fluid chamber used in Examples I and II was used.

TABLE III

| Item | Process Conditions |
|---|---|
| Tension entering feed roll in grams | 375 |
| Temperatures, °F. | |
| Feed roll (9 wraps) | 215 |
| Draw roll (5 wraps) | 408 |
| Fluid jet steam | 650 |
| Fluid Jet Steam | |
| Flow, lb/hr. | 25 |
| Pressure, psig | 60 |
| Package weight, net lbs. | 7 |
| Package diameter, ins. | 7 |

The textured product was 2640 denier. Process conditions other than those illustrated in Table III are the same as depicted in Table I of Example I. The yarn produced was comparable to that produced in the two previous examples.

The invention above described finds significant utility in processing nylon yarns for manufacturing carpets and other similar products as evidenced by the above specific examples, but the invention may also be equally applicable to polyester and other synthetic filament yarns. Reasonable modification in the present invention may be possible with respect to the particular apparatus used in each step.

What is claimed is:

1. A method for controlling a yarn plug length in a crimping zone which comprises:

feeding a yarn to a heating zone *comprising a first heated roll*, thereafter feeding the yarn to a yarn crimping zone and producing a yarn plug therein;

monitoring the length of said yarn plug produced in said crimping zone;

increasing the temperature of the yarn in said heating zone *by increasing the temperature of the first heated roll* if the plug length is too long;

decreasing the temperature of the yarn in said heating zone *by decreasing the temperature of the heated roll* if the plug is too short.

2. The method of claim 1 wherein the [temperature of the yarn is controlled by controlling the temperature of the yarn in a yarn feeding zone, said yarn feeding zone for feeding the yarn to the crimping zone] *heating zone comprises said first heated roll and a second heated roll wherein said first heated roll is positioned downstream of said second heated roll and is operated at a higher peripheral speed as compared to said second heated roll so that the yarn is drawn.*

[3. The method of claim 1 wherein the temperature of the yarn is controlled by controlling the temperature of a yarn drawing zone, said yarn drawing zone for drawing the yarn and feeding the drawn yarn to the crimping zone.]

4. An apparatus for controlling the plug length of a yarn produced by a crimping means comprising:

*a heated feed roll;* crimping means for producing a yarn plug;

monitoring means for monitoring the length of the yarn plug;

temperature control means; and coupling means coupling said monitoring means with said control means for controlling the temperature of the yarn upstream of the crimping means *by controlling the temperature of the heated feed roll*, said control means causing the temperature of the yarn to increase when said monitoring means detects a length of yarn plug which is too long and to decrease when the monitoring means detects a length of yarn plug which is too short.

5. The apparatus of claim 4 wherein said monitoring means comprises an electric eye.

6. The apparatus of claim 4 wherein said crimping means comprises a fluid jet.

*7. The apparatus of claim 6 wherein the fluid is steam.*

*8. The apparatus of claim 4 further comprising a heated draw roll positioned downstream of the heated feed roll.*

* * * * *